United States Patent
Jung et al.

(10) Patent No.: US 7,282,829 B2
(45) Date of Patent: Oct. 16, 2007

(54) ROTOR FOR LINE-START RELUCTANCE MOTOR

(75) Inventors: Tae-Uk Jung, Masan-Shi (KR); Jae-Boo Eom, Ulsan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/532,226

(22) PCT Filed: Dec. 11, 2003

(86) PCT No.: PCT/KR03/02717

§ 371 (c)(1),
(2), (4) Date: Oct. 31, 2005

(87) PCT Pub. No.: WO2004/054068

PCT Pub. Date: Jun. 24, 2004

(65) Prior Publication Data

US 2006/0108888 A1    May 25, 2006

(30) Foreign Application Priority Data

Dec. 12, 2002   (KR)   ............... 10-2002-0079136
Dec. 14, 2002   (KR)   ............... 10-2002-0079965

(51) Int. Cl.
  *H02K 1/22*     (2006.01)
  *H02K 17/16*    (2006.01)
  *H02K 17/26*    (2006.01)
  *H02K 19/02*    (2006.01)
  *H02K 19/14*    (2006.01)

(52) U.S. Cl. .................................... 310/211
(58) Field of Classification Search ............. 310/162, 310/166, 168, 211, 212, 216, 261
See application file for complete search history.

(56) References Cited

U.S. PATENT DOCUMENTS

| | | | | |
|---|---|---|---|---|
| 2,483,848 A | * | 10/1949 | Saretzky | ............... 310/162 |
| 3,243,620 A | * | 3/1966 | Suhr et al. | ............... 310/162 |
| 3,493,799 A | * | 2/1970 | Lacroux | ............... 310/166 |
| 3,597,646 A | * | 8/1971 | Lawrenson | ............... 310/166 |
| 3,721,844 A | | 3/1973 | Fong | |
| 5,559,386 A | * | 9/1996 | Gurrieri | ............... 310/211 |

FOREIGN PATENT DOCUMENTS

| | | |
|---|---|---|
| GB | 449202 A | 6/1936 |
| GB | 1206112 A | 9/1970 |
| JP | 63-217957 A | 9/1988 |
| JP | 11-146615 A | 5/1999 |
| JP | 2000-197325 A | 7/2000 |

* cited by examiner

*Primary Examiner*—Tran Nguyen
(74) *Attorney, Agent, or Firm*—Birch, Stewart, Kolasch & Birch, LLP

(57) ABSTRACT

A rotor for a line-start reluctance motor is provided to improve core area efficiency to make flux flow in one direction. The rotor for the line-start reluctance motor includes a core having an axis coupling hole in a coupling direction of a shaft, a plurality of bars formed in the periphery of the core, and a plurality of flux barriers, one and the other ends of the flux barriers approaching the bars formed in first and second areas facing each other at a predetermined angle on a central line of a first axis on a core plane vertical to the coupling direction, at least parts of the centers of the flux barriers passing through a third or fourth area between the first and second areas, surrounding the axis coupling hole at predetermined intervals.

46 Claims, 12 Drawing Sheets

FIRST AXIS → SECOND AXIS

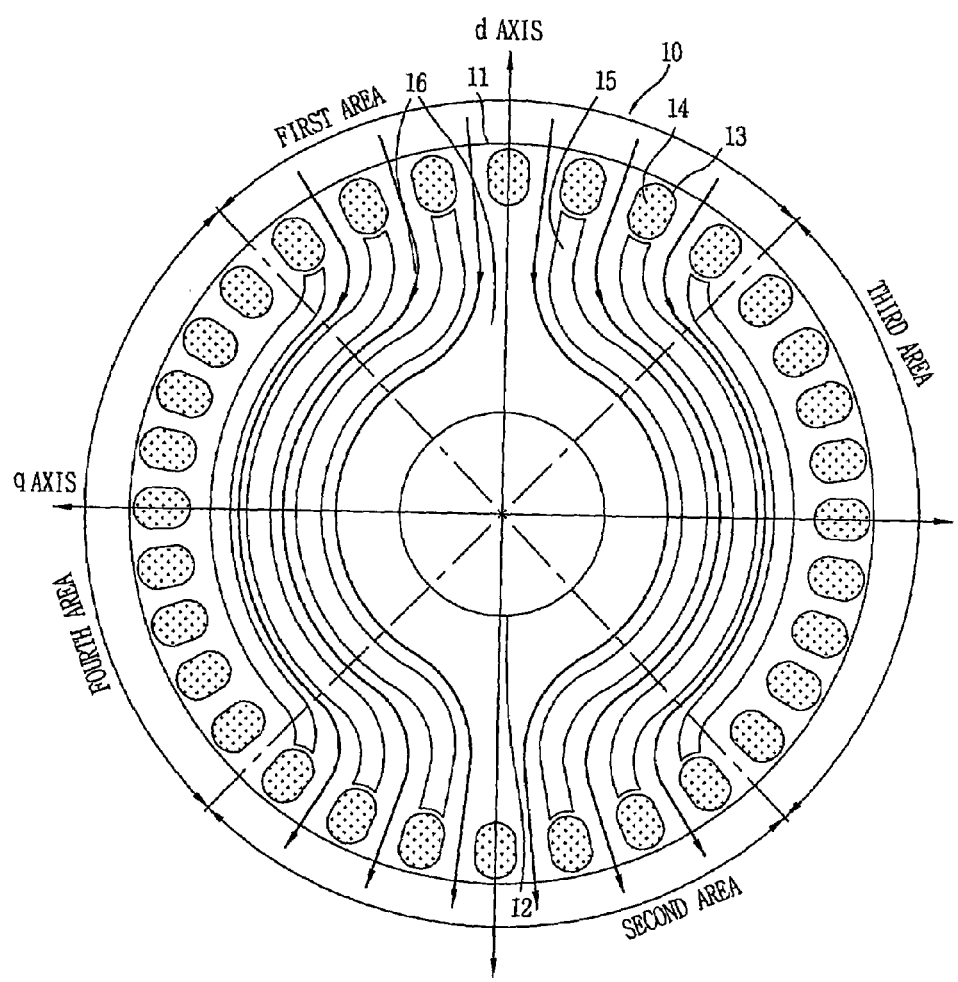

ROTOR FOR LINE-START RELUCTANCE MOTOR

TECHNICAL FIELD

The present invention relates to a rotor for a line-start reluctance motor, and more particularly to, a rotor for a line-start reluctance motor which improves core area efficiency to make flux flow in one direction.

BACKGROUND ART

A line-start reluctance motor is a single phase power alternating motor for performing constant speed motion. It is a combination type of an induction motor and a reluctance motor. The line-start reluctance motor includes a stator for forming a rotating magnetic field by alternating current applied to windings, and a rotor positioned in the stator and rotated by the rotating magnetic field formed by the stator. The line-start reluctance motor uses a rotary force generated when flux of the stator passes through the rotor and the rotor moves in a direction of decreasing reluctance (magnetic resistance). That is, in the start operation, the line-start reluctance motor starts to be rotated by using start torque generated by mutual operations of variations of the flux of the stator and current deserted in bars as in an induction motor, and after the start operation, the line-start reluctance motor is rotated in a constant speed by using reluctance torque making the flux of the stator flow through a core portion of the rotor.

As disclosed in U.S. Laid-Open Patent Application 3,862,446, a rotor for a two pole synchronous reluctance motor includes a core having a pair of effective oppositely disposed salient poles for improving initial start properties of the reluctance motor, a plurality of circumferentially spaced interconnected conductors in each salient pole portion adjacent to the periphery thereof forming main pole windings, the main conductors of each pole encompassing 90 mechanical degrees of the rotor core, flux barriers formed in and extending across the core between the main pole windings with the ends thereof circumferentially spaced from the main pole winding, and at least one additional secondary conductor located in the space between the ends of each main pole winding and each end of the flux barrier adjacent to the periphery of the core, the space between the ends of the main pole windings and the circumferentially nearest secondary conductor being greater than the space between any two adjacent main conductors, the conductors being connected together to form a squirrel.

According to U.S. Laid-Open Patent Application 6,604,134, a rotor assembly for a synchronous reluctance motor includes a shaft, a core having a plurality of shaped supports, the supports being configured, dimensioned and positioned to define a plurality of channels, the core being mounted on the shaft, a plurality of generally arcuate rotor sections, each of the rotor sections secured within a respective channel of the core, and a plurality of bands disposed circumferentially about the rotor sections for securing the rotor sections to the core.

In addition, as suggested in U.S. Laid-Open Patent Application 6,066,904, a mechanical device selected from a synchronous reluctance machine and a switched reluctance machine includes a rotor having a central axis, the rotor formed by a plurality of radial laminations, the laminations being stacked axially and being made of grain-oriented magnetic material having a direction of highest magnetic permeability, the direction of highest magnetic permeability of the magnetic material being parallel to a plane that bisects each of the laminations, each of the laminations having at least one pair of internal slots, at least one pair of internal slots being aligned in a direction at least generally parallel to the plane, and at least one pair of internal slots being symmetric about the plane.

As described above, the conventional rotors have a number of complicated elements, which consumes a lot of time and expenses during the production.

In addition, the conventional rotors require special elements (for example, conductors made of magnetic material).

The conventional arts do not provide maximum outputs and efficiency of the rotor based on a difference between flux density in a high permeable direction (for example, d axis) and flux density in a low permeable direction (for example, q axis).

Furthermore, the conventional arts do not provide shapes and alignments of bars for giving efficient output properties to the rotor by preventing magnetic saturation in the core.

DISCLOSURE OF THE INVENTION

An object of the present invention is to provide a rotor for a line-start reluctance motor which reduces time and expenses in production by using simple elements.

Another object of the present invention is to provide a rotor for a line-start reluctance motor which uses general stacked cores.

Yet another object of the present invention is to provide a rotor for a line-start reluctance motor which has high outputs and efficiency, by maximizing a difference between flux density in a high permeable direction and flux density in a low permeable direction.

Yet another object of the present invention is to provide a rotor for a line-start reluctance motor which has efficient start properties by changing shapes and alignments of bars.

In order to achieve the above-described objects of the invention, there is provided a rotor for a line-start reluctance motor including: a core having an axis coupling hole in a coupling direction of a shaft; a plurality of bars formed in the periphery of the core; and a plurality of flux barriers, one and the other ends of the flux barriers approaching the bars formed in first and second areas facing each other at a predetermined angle on a central line of a first axis on a core plane vertical to the coupling direction, at least parts of the centers of the flux barriers passing through a third or fourth area between the first and second areas, surrounding the axis coupling hole at predetermined intervals.

Preferably, the flux barriers surround the axis coupling hole in a circular arc shape.

Preferably, the flux barriers are continuous.

Preferably, the flux barriers are symmetric on a second axis vertical to the first axis on the core plane.

A rate of an area of the flux barriers to a whole area of the core plane is preferably 0.35 to 0.45, more preferably, 0.39.

A rate of a whole width of the flux barriers to a width between the axis coupling hole and the outer circumference of the core is preferably 0.35 to 0.45, more preferably 0.405.

Central lines of one and the other ends of the flux barriers and central lines of the bars which the flux barriers approach are preferably disposed in the same directions, the central lines of the bars facing the center of the core. More preferably, the central lines of the bars and the central lines of the flux barriers are disposed on the same lines.

Preferably, a width of the flux barriers is equal to or smaller than that of the bars which the flux barriers approach.

Intervals between the flux barriers and the bars which the flux barriers approach are preferably constant, more preferably less than 0.35 mm.

Preferably, a width of the outer circumferences of the bars adjacent to the outer circumference of the core is larger than that of the inner circumferences of the bars adjacent to the flux barriers.

Preferably, some of the bars in the first and second areas are not adjacent to the flux barriers.

Preferably, intervals between the bars and the outer circumference of the core are all the same.

Preferably, the flux barriers are formed between the bars in the third and fourth areas.

Preferably, an area of the bars in the third and fourth areas is smaller than that of the bars in the first and second areas.

Preferably, intervals between the bars in the third and fourth areas are smaller than those between the bars in the first and second areas.

Preferably, a width of the outer circumferences of the bars in the third and fourth areas is larger than that of the outer circumferences of the bars in the first and second areas.

An angle of the first and second areas is preferably 100 to 110°, more preferably, 104°.

Preferably, a length of the bars in the first and second areas is larger than that of the bars in the third and fourth areas.

Preferably, at least one flux barrier is formed between a common tangent line of the inner circumferences of the bars in the first and second areas and a common tangent line of the inner circumferences of the bars in the third and fourth areas.

According to one aspect of the invention, a rotor for a line-start reluctance motor includes: a core having an axis coupling hole in a coupling direction of a shaft; a plurality of bars formed in the periphery of the core; and a plurality of flux barriers having their both ends aligned in one direction to approach the bars, respectively, central lines of the bars facing the center of the core and central lines of both ends of the flux barriers being formed in the same directions.

According to another aspect of the invention, a rotor for a line-start reluctance motor includes: a core having an axis coupling hole in a coupling direction of a shaft; a plurality of bars formed in the periphery of the core; and a plurality of flux barriers having their both ends aligned in one direction to approach the bars, respectively, a width of the flux barriers being equal to or smaller than that of the bars which both ends of the flux barriers approach.

According to yet another aspect of the invention, a rotor for a line-start reluctance motor includes: a core having an axis coupling hole in a coupling direction of a shaft; a plurality of bars formed in the periphery of the core; and a plurality of flux barriers aligned in one direction, a length of the bars disposed in an alignment direction of the flux barriers being larger than that of the bars disposed in a vertical direction to the alignment direction of the flux barriers.

BRIEF DESCRIPTION OF THE DRAWINGS

FIG. 1B is a plane view illustrating the area-divided rotor of FIG. 1A;

BEST MODE FOR CARRYING OUT THE INVENTION

Figure 1A:
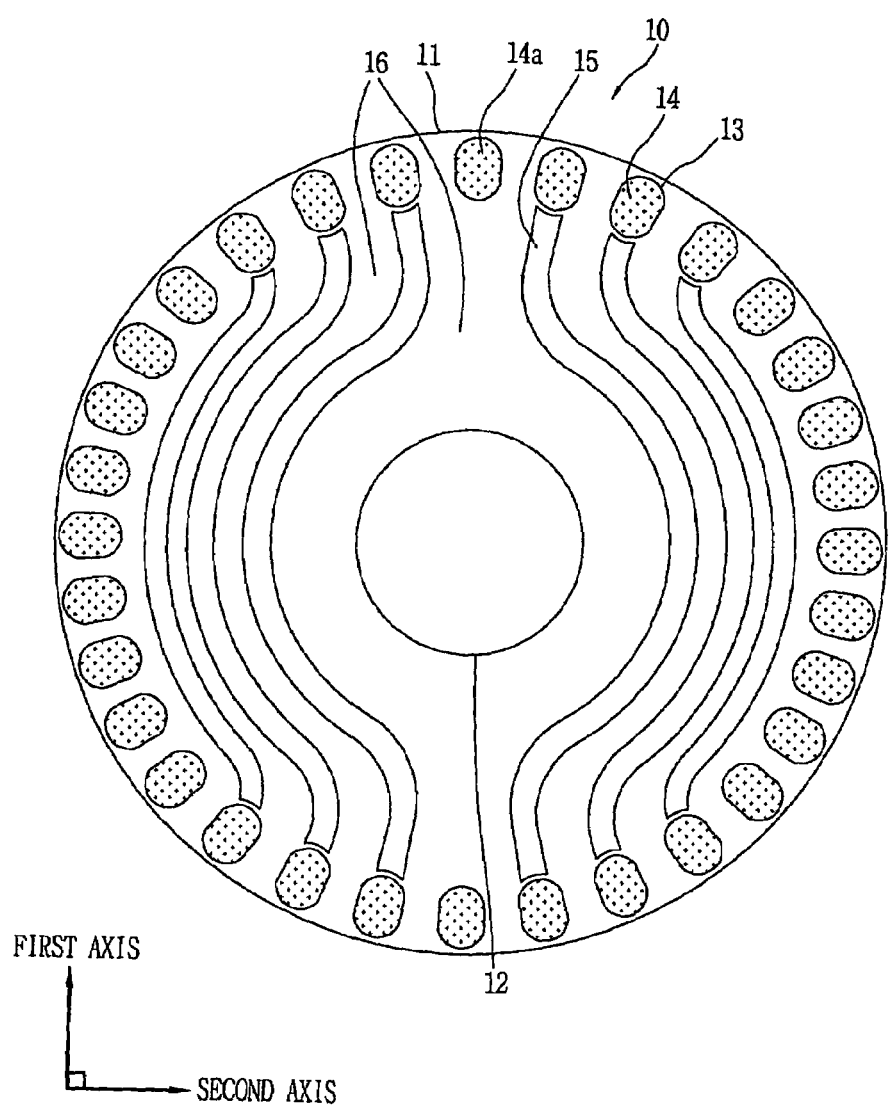
FIG. 1A is a plane view illustrating a rotor for a line-start reluctance motor in accordance with a first embodiment of the present invention.

FIGS. 1A and 1B are plane views illustrating a rotor for a line-start reluctance motor in accordance with a first embodiment of the present invention.

Referring to FIG. 1A, a rotor 10 includes a core 11 having an axis coupling hole 12 formed in a coupling direction of a shaft (not shown). The core 11 includes a plurality of bar insertion holes 13 in its periphery, and a plurality of bars 14 are inserted into the bar insertion holes 13. In addition, the core 11 has a plurality of flux barriers 15 extending toward a first axis vertical to the coupling direction of the shaft (hereinafter, referred to as 'coupling direction'), and being symmetric to each other on a second axis vertical to the first axis. Parts of the core 11 between the plurality of flux barriers 15 which flux flows through are flux paths 16.

In detail, the rotor 10 is comprised of a plurality of stacked core planes, and the core 11 does not require special magnetic materials.

The bars 14 are inserted into the bar insertion holes 13 of the core 11, and extend toward the same positions of the stacked core planes. Generally, the bars 14 include aluminum elements.

The flux barriers 15 are formed by removing parts of the core 11 and filling them with air. The flux barriers 15 have their one and the other ends aligned and extended in the first axis direction, and have at least parts of their centers extended to surround the axis coupling hole 12 at predetermined intervals, to easily pass the flux in the first axis direction and minimize passing density of the flux in the second axis direction. That is, the flux barriers 15 generate the maximum flux density in the first axis direction and the minimum flux density in the second axis direction vertical to the first axis direction, thereby remarkably improving a start force of the rotor 10.

In addition, the flux barriers 15 are disposed to surround the axis coupling hole 12 in a circular arc shape, and thus improve a rotary force and start performance of the rotor 10, without interrupting flow of the flux from a stator (not shown).

In the related arts, the flux barrier is formed in an intermittent shape having a bridge in its center. Accordingly, magnetic saturation is generated in the bridge portion, to interrupt flow of the flux. In order to prevent the magnetic saturation, the core 11 includes the continuous flux barriers 15. Such continuous flux barriers 15 prevent the magnetic saturation, facilitate flow of the flux, and thus improve start performance of the rotor 10. Moreover, the continuous flux barriers 15 reduce time and expenses during the production of the rotor 10.

If the flux barriers 15 occupy a large area of the core 11 of the rotor 10, an area of the core 11 which the flux flows through in the first axis direction decreases, to cause the magnetic saturation in the core 11. It is thus necessary to control a rate of the area of the magnetic barriers 15 to the area of the core 11 (or area of the flux paths 16). A width of the flux barriers 15 is also an important factor for facilitating flow of the flux. That is, when the width of the flux barriers 15 is excessively large, a width of the core 11 which the flux flows through decreases, and when the width of the flux barriers 15 is excessively small, it is difficult to maximize a difference between flux density in the first axis direction and flux density in the second axis direction. As a result, it is necessary to control a rate of a whole width of the flux barriers 15 to a width between the axis coupling hole 12 and the outer circumference of the core 11.

Some 14a of the bars 14 can be formed not to be adjacent to the flux barriers 15 in consideration of the area of the flux barriers 15, and to form the flux barriers 15 symmetric to each other in the first axis direction.

As illustrated in FIG. 1B, the rotor 10 can be divided into first and second areas facing each other at a predetermined angle on a central line of the first axis on the plane of the core 11 vertical to the coupling direction, and also be divided into third and fourth areas between the first and second areas. Here, d axis used as the first axis in FIG. 1A indicates a high permeable direction of the flux, and q axis used as the second axis in FIG. 1A indicates a low permeable direction of the flux.

In detail, the bars 14 in the first and second areas are adjacent to one and the other ends of the flux barriers 15, so that the flux (indicated by bold solid lines) can easily flow between the bars 14 and through the flux paths 16 extended therefrom. Accordingly, the first axis, namely d axis becomes the high permeable direction axis of the flux. The centers of the flux barriers 15 pass through the third or fourth area, surrounding the axis coupling hole 12 at predetermined intervals. The flux does not flow between the bars 14 in the third and fourth areas, and thus the second axis, namely q axis becomes the low permeable direction axis of the flux.

Figure 1C:
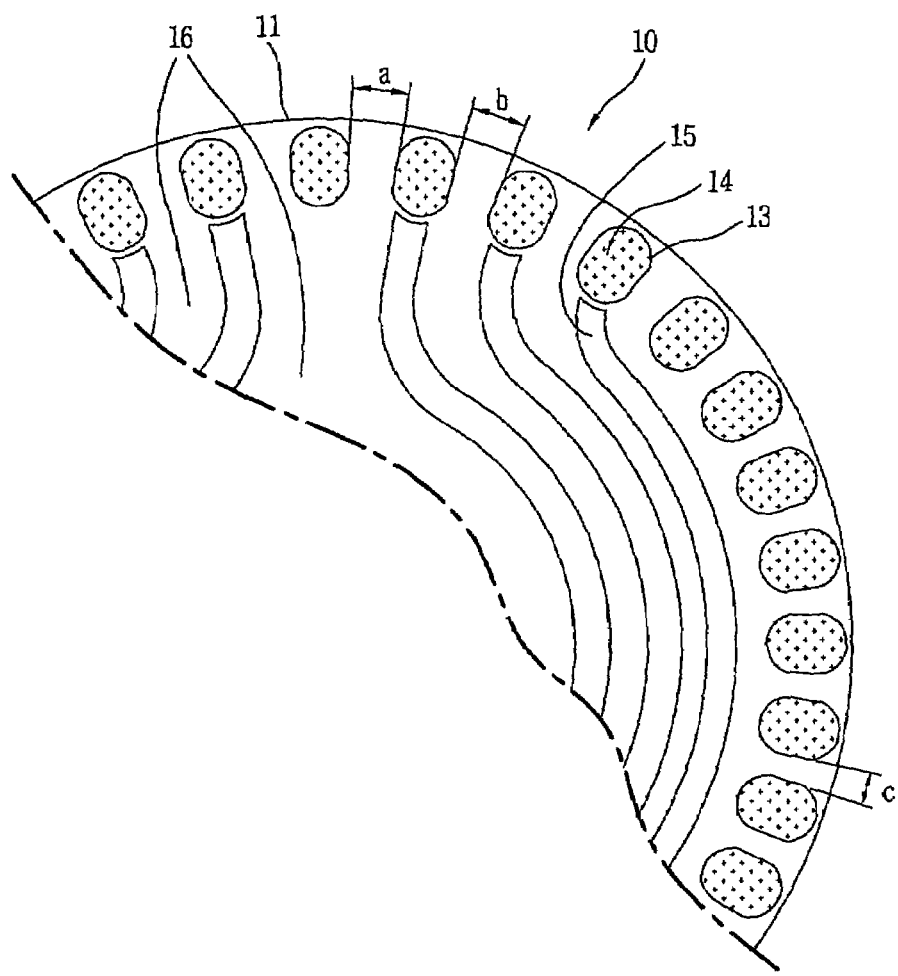
FIGS. 1C and 1D are partial plane views of FIG. 1A.

FIG. 1C is a partial plane view of FIG. 1A. As shown in FIG. 1C, in order to increase a difference between flux density in the first axis (d axis) direction and flux density in the second axis (q axis) direction, in the rotor 10, intervals (c) between the bars 14 in the second axis direction (namely, third and fourth areas) are smaller than intervals (a) and (b) between the bars 14 in the first axis direction (namely, first and second areas). Thus, the magnetic saturation is generated in the intervals (c), thereby minimizing flow of the flux from the stator to the core 11 in the second axis direction. That is, the second axis direction bars 14 serve as barriers.

Figure 1D:
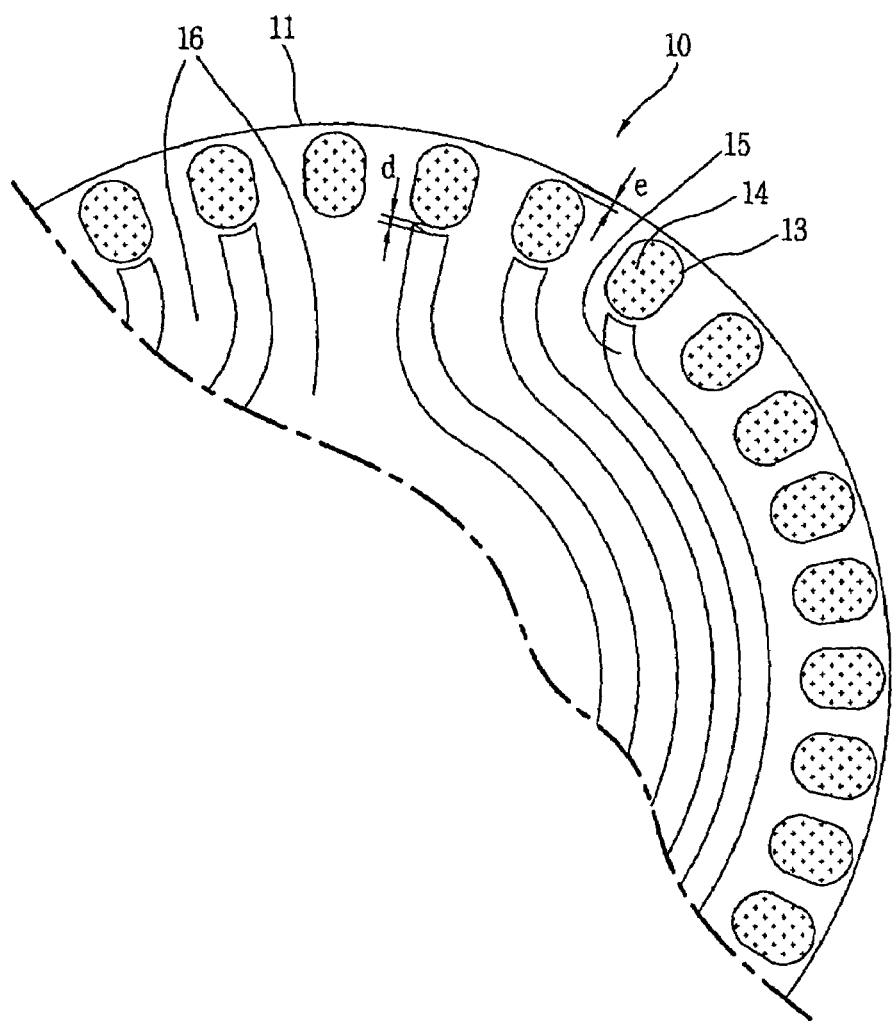

FIG. 1D is a partial plane view of FIG. 1A. As depicted in FIG. 1D, one and the other ends of the flux barriers 15 approach the bars 14 and/or bar insertion holes 13 symmetric on the second axis. Intervals (d) between the flux barriers 15 and the bars 14 and/or bar insertion holes 13 are constant. Thus, generation of the saturation of the flux flowing in the first axis direction is minimized in the intervals (d), and intensity of the rotor 10 is maintained. Accordingly, one and the other ends of the flux barriers 15 are formed according to shapes of the inner circumferences of the bar insertion holes 13 and/or bars 14 (more exactly, surfaces adjacent to one and the other ends of the flux barriers 15). Here, the intervals (d) are preferably less than 0.35 mm.

In addition, the bar insertion holes 13 and/or bars 14 are formed to equalize intervals (e) between the bars 14 and the outer circumference of the core 11.

Figure 1E:
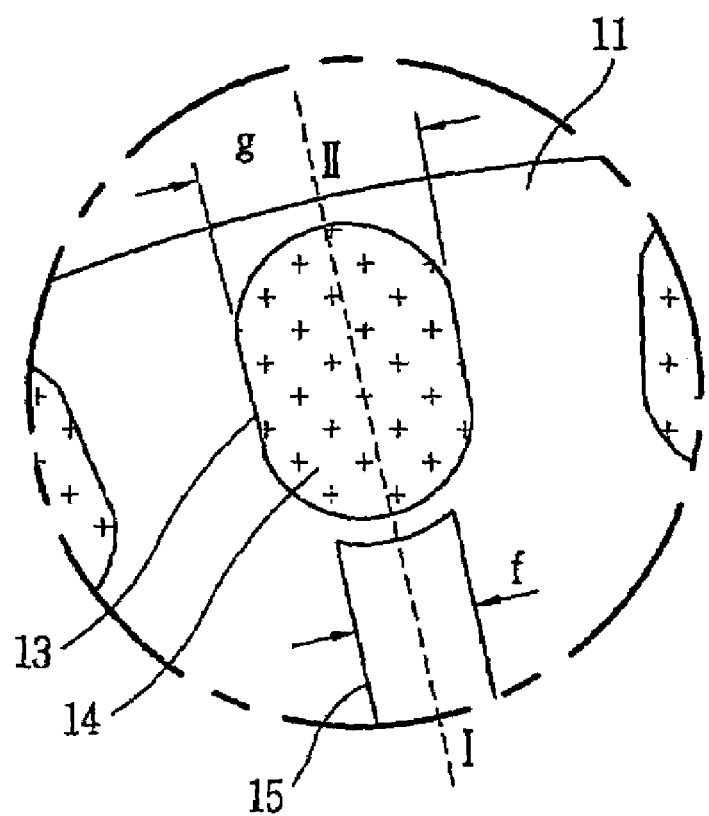
FIG. 1E is a partial enlarged view of FIG. 1A.

FIG. 1E is a partial enlarged view of FIG. 1A. As illustrated in FIG. 1E, a central line I of one and/or the other end of the flux barrier 15 and a central line II of the bar 14 which the flux barrier 15 approaches (line equally dividing the area of the bar 14 and facing the axis coupling hole 12 (or center of the core 11)) are disposed on the same line. Such an alignment prevents the flux flowing from the stator to the core 11 from colliding against the flux barriers 15, and makes the flux easily flow through the core 11 and/or flux paths 16.

Still referring to FIG. 1E, a width (f) of the flux barrier 15 is equal to or smaller than a width (g) of the bar 14 which the flux barrier 15 approaches. Such a width difference prevents both ends of the flux barriers 15 from interrupting flow of the flux from the stator, and makes the flux easily flow through the core 11 and/or flux paths 16.

Figure 2A:
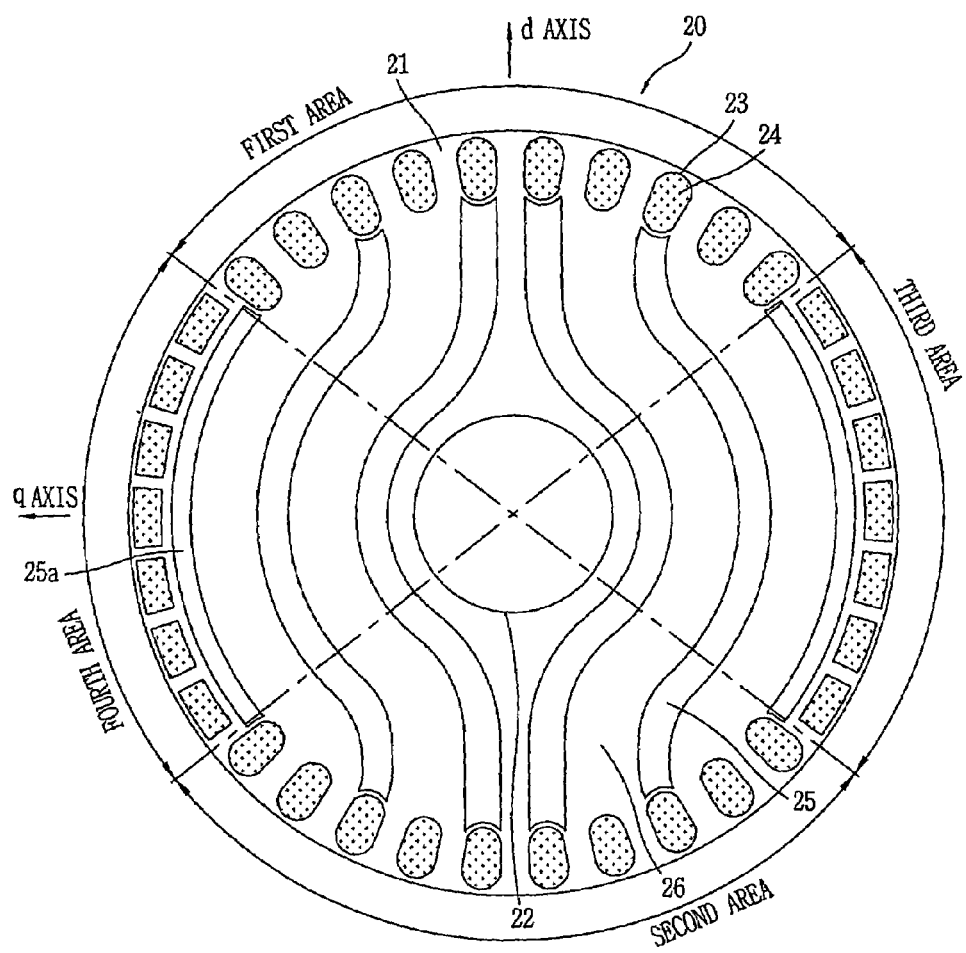
FIGS. 2A and 2B are plane views illustrating a rotor for a line-start reluctance motor in accordance with a second embodiment of the present invention.
Figure 2B:
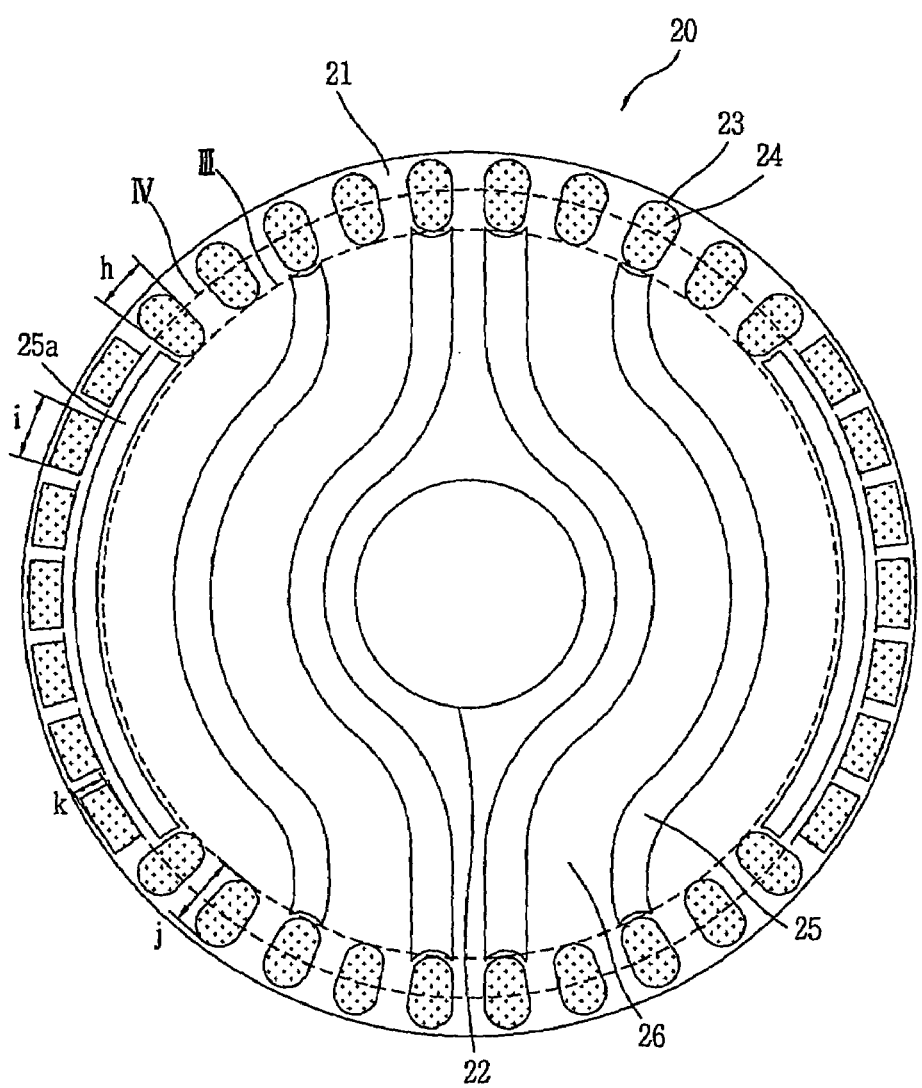

FIGS. 2A and 2B are plane views illustrating a rotor for a line-start reluctance motor in accordance with a second embodiment of the present invention. The rotor 20 of FIG. 2A has the aforementioned properties of the rotor 10 of FIG. 1A, and also has additional properties described below.

As shown in FIG. 2A, flux enters the rotor 20 in the d axis direction and flows through flux paths 26, but rarely flows in the q axis direction. The detailed explanation of the rotor 20 will later be explained with reference to FIG. 2B.

Still referring to FIG. 2A, as identical to the rotor 10 of FIG. 1A, the rotor 20 is divided into first and second areas facing each other at a predetermined angle α on a central line of d axis on a core plane vertical to a coupling direction, and also be divided into third and fourth areas between the first and second areas. In consideration of a start force of the rotor 20, the angle α is preferably 100 to 110°, more preferably, 104°.

The rotor 20 is provided with additional properties in bars 24 and flux barriers 25 in the third and fourth areas.

In detail, an area of the bars 24 in the third and fourth areas is equal to or smaller than that of the bars 24 in the first and second areas. That is, the bars 24 having the reduced area in the third and fourth areas perform the same function as the flux barriers 25. However, intervals between the outer circumferences of the bars 24 and the outer circumference of a core 21 in the third and fourth areas are identical to intervals between the outer circumferences of the bars 24 and the outer circumference of the core 21 in the first and second areas. The other characteristics are described below.

As depicted in FIG. 2B, a width (h) of the outer circumferences of the bars 24 in the first and second areas is equal to or smaller than a width (i) of the outer circumferences of the bars 24 in the third and fourth areas. Accordingly, the flux easily flows around the bars 24 in the first and second areas, and less flows around the bars 24 in the third and fourth areas. As a result, the bars 24 in the third and fourth areas perform the same function as the flux barriers 25.

As explained in FIG. 1A, the properties in the area and width of the bars 24 in the third and fourth areas are operated simultaneously or separately with the properties in the intervals of the bars 24 in the third and fourth areas, so that the bars 24 in the third and fourth areas can perform the same function as the flux barriers 25, thereby remarkably increasing a difference between flux density on d axis and flux density on q axis.

In the direction of an axis coupling hole 22, a length (j) of the bars 24 in the first and second areas is larger than a length (k) of the bars 24 in the third and fourth areas. Such a length difference influences the properties in the area and width of the bars 24 and minimizes the whole area of the bars 24 in the third and fourth areas, thereby improving efficiency of the core area. In addition, at least one flux barrier 25a can be formed between a common tangent line III of the inner circumferences of the bars 24 in the first and second areas and a common tangent line IV of the inner circumferences of the bars 24 in the third and fourth areas. As the bars 24 in the third and fourth areas perform the same function as the flux barriers 25, the flux barrier 25a remarkably increases the difference between flux density on d axis and flux density on q axis.

As described above, when the flux barriers 25 and 25a occupy a large area of the core 21 of the rotor 20, an area of the core 21 and/or flux paths 26 which the flux flows through in the d axis direction decreases, to generate magnetic saturation in the core 21. It is thus necessary to control a rate of the area of the flux barriers 25 and 25a to the area of the core 21. In the rotor 20 of the invention, a rate of a whole area of the flux barriers 25 and 25a to a whole area of the core plane is preferably 0.35 to 0.45, more preferably, 0.39.

Figure 2C:
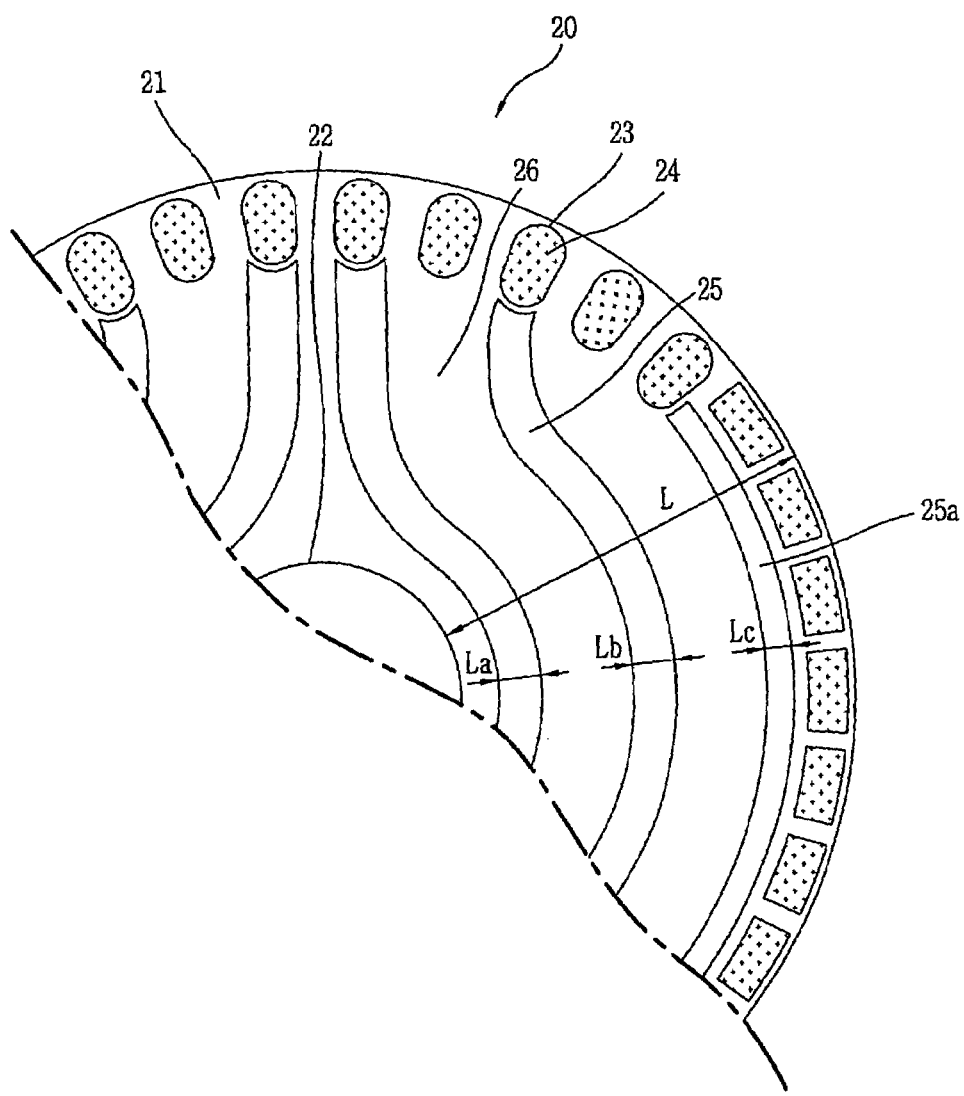
FIG. 2C is a partial plane view of FIG. 2A.

FIG. 2C is a partial plane view of FIG. 2A. In addition to the rate of the area, a width of the flux barriers is an important factor for facilitating flow of the flux. That is, when the width of the flux barriers 25 and 25a is excessively large, the width of the core 21 which the flux flows through decreases, and when the width of the flux barriers 25 and 25a is excessively small, it is difficult to maximize the difference between flux density in the d axis direction and flux density in the q axis direction. Preferably, a rate of a whole width (L1) of the flux barriers 25 and 25a (L1=La+Lb+Lc; total widths of the flux barriers 25 and 25a formed in the width L) to a width (L) between the axis coupling hole 22 and the outer circumference of the core 21 is 0.35 to 0.45, more preferably 0.405.

Figure 3:
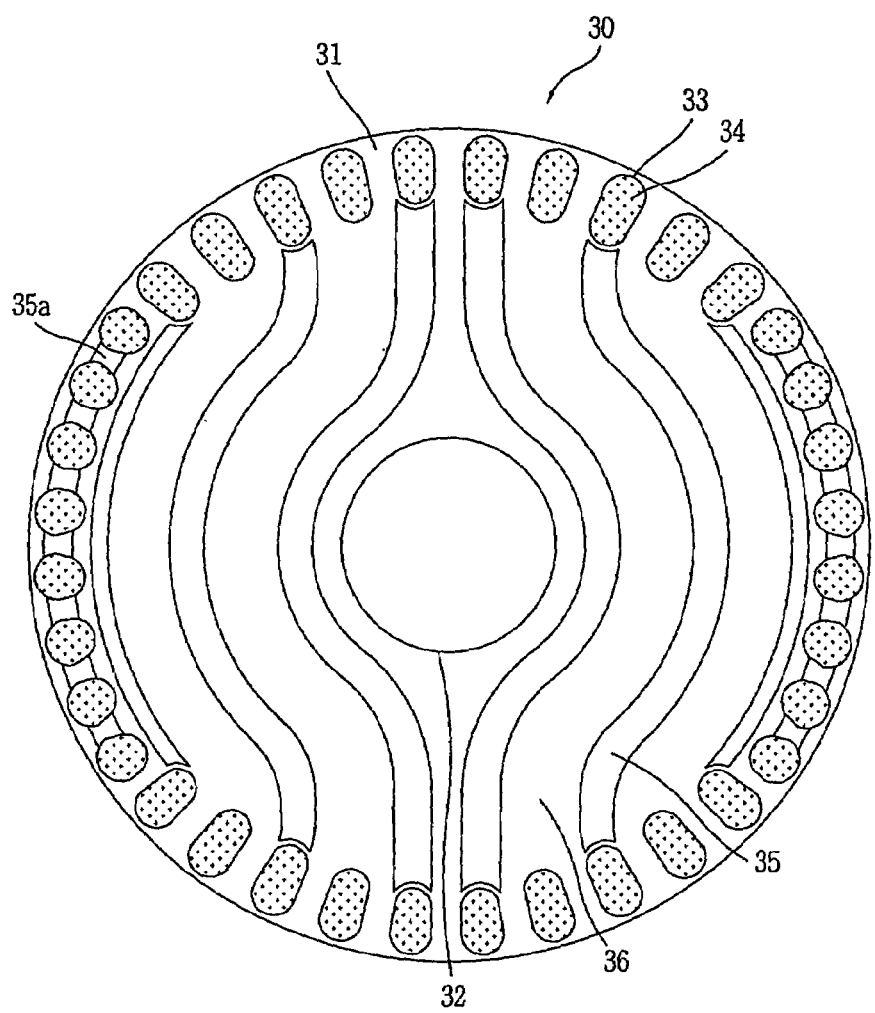
FIG. 3 is a plane view illustrating a rotor for a line-start reluctance motor in accordance with a third embodiment of the present invention.

FIG. 3 is a plane view illustrating a rotor for a line-start reluctance motor in accordance with a third embodiment of the present invention. The rotor 30 of FIG. 3 has the whole properties of the rotor 10 of FIG. 1A and some properties of the rotor 20 of FIG. 2 (for example, except the flux barrier 25a), and also has additional properties.

In detail, in a core 31 of the rotor 30, bars 34 in third and fourth areas are installed in flux barriers 35a. That is, the flux barriers 35a are formed between the bars 34 in the third and fourth areas. Flux entering between the bars 34 do not flow into the core 31 due to the flux barriers 35a. Therefore, a difference between flux density on d axis and flux density on q axis considerably increases.

Figure 4:
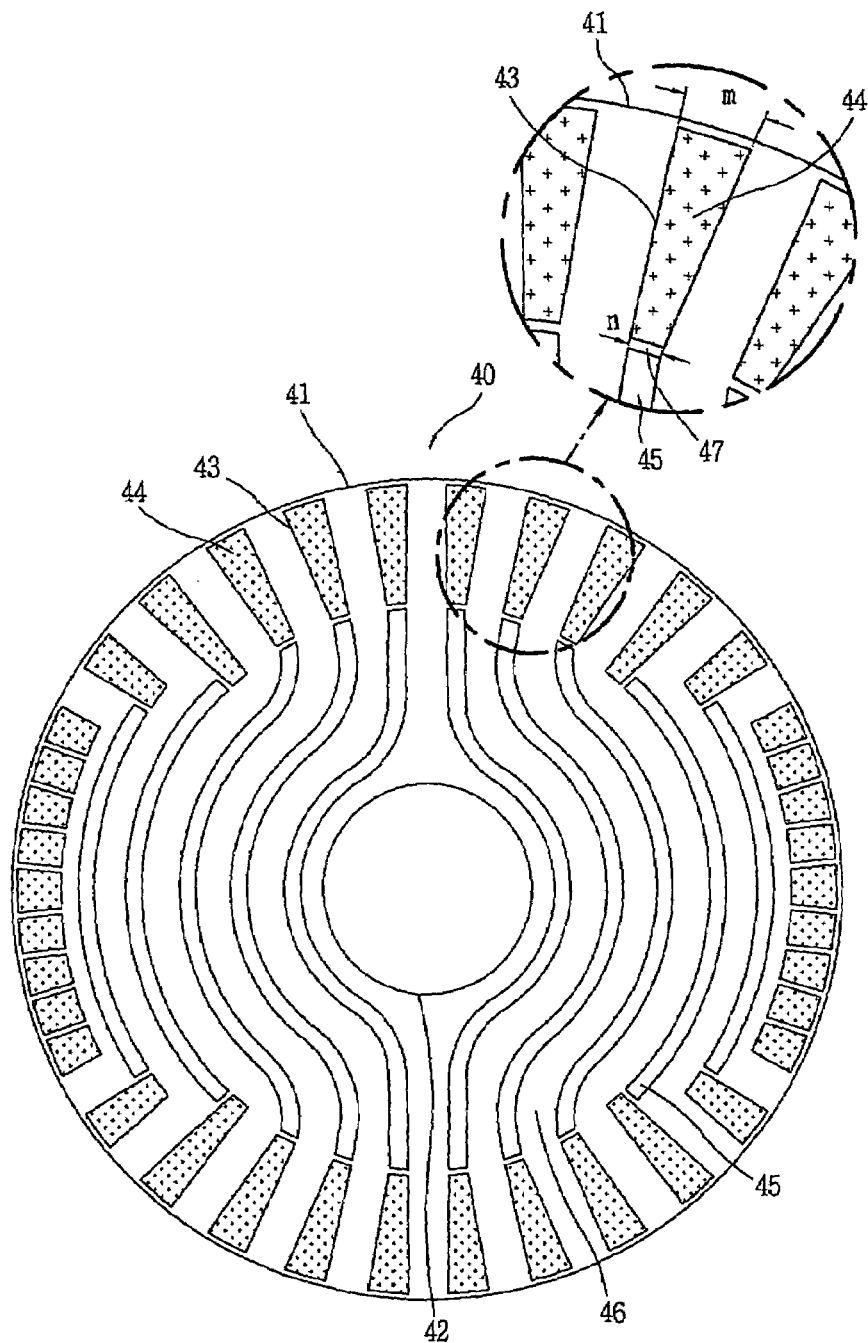
FIG. 4 is a plane view illustrating a rotor for a line-start reluctance motor in accordance with a fourth embodiment of the present invention.

FIG. 4 is a plane view illustrating a rotor for a line-start reluctance motor in accordance with a fourth embodiment of the present invention. The rotor 40 of FIG. 4 has the whole properties of the rotor 10 of FIG. 1A and the whole properties of the rotor 20 of FIG. 2A, and also has additional properties.

In detail, a width (m) of the outer circumferences of bars 44 adjacent to the outer circumference of a core 41 is equal to or larger than a width (n) of the inner circumferences of the bars 44 adjacent to flux barriers 45. Especially, such a structure is formed in the bars 44 in first and second areas, and makes flux entering the core 41 obtain sufficient intervals between the bars 44. It prevents magnetic saturation, and facilitates flow of the flux entering the core 41. As the width (n) of the inner circumferences of the bars 44 decreases, an area of gaps 47 between the bars 44 and the flux barriers 45 relatively decreases. Accordingly, the magnetic saturation is prevented between the gaps 47.

Figure 5:
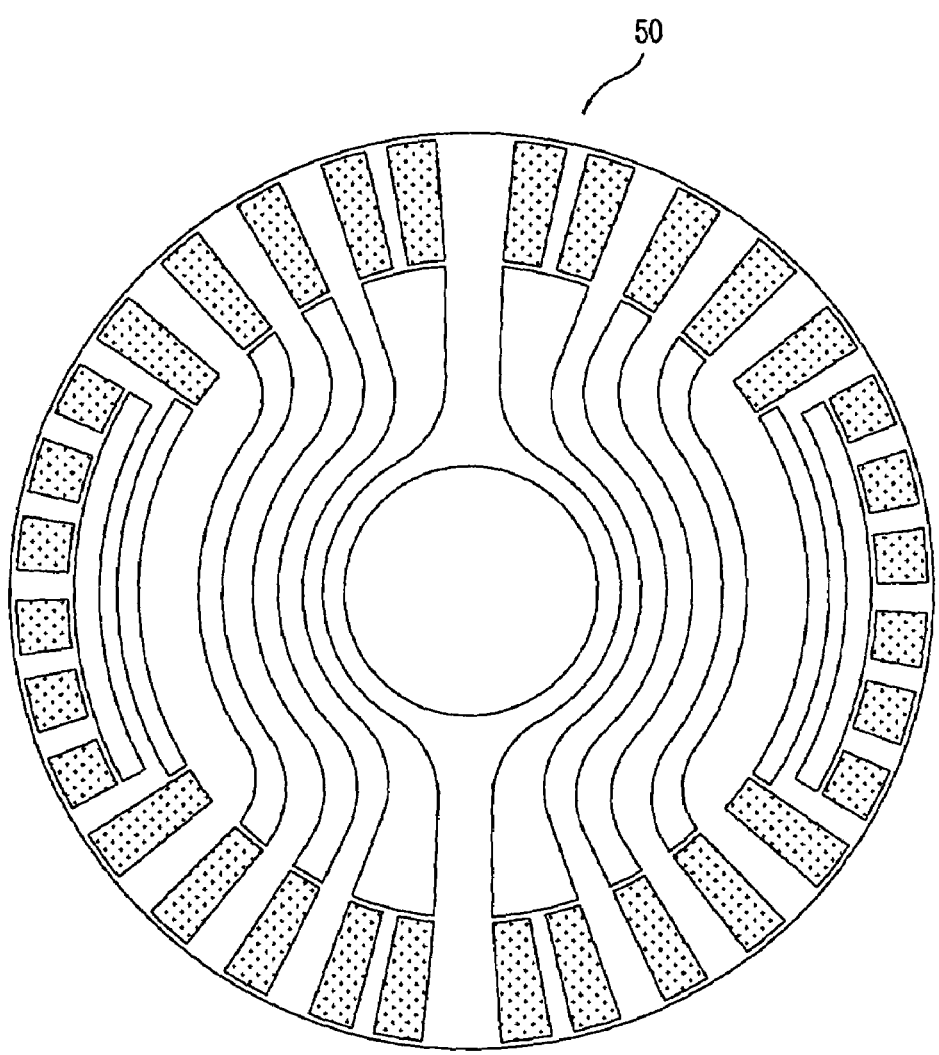
FIG. 5 is a plane view illustrating a rotor for a line-start reluctance motor in accordance with a fifth embodiment of the present invention.

FIG. 5 is a plane view illustrating a rotor for a line-start reluctance motor in accordance with a fifth embodiment of the present invention. The rotor 50 of FIG. 5 has the whole properties of the rotor 10 of FIG. 1A, the whole properties of the rotor 20 of FIG. 2A and the whole properties of the rotor 40 of FIG. 4.

The characteristics of the rotors 10, 20, 30 and 40 can be applied to all rotors like the rotor 50 of FIG. 5, or selectively applied thereto.

Figure 6:
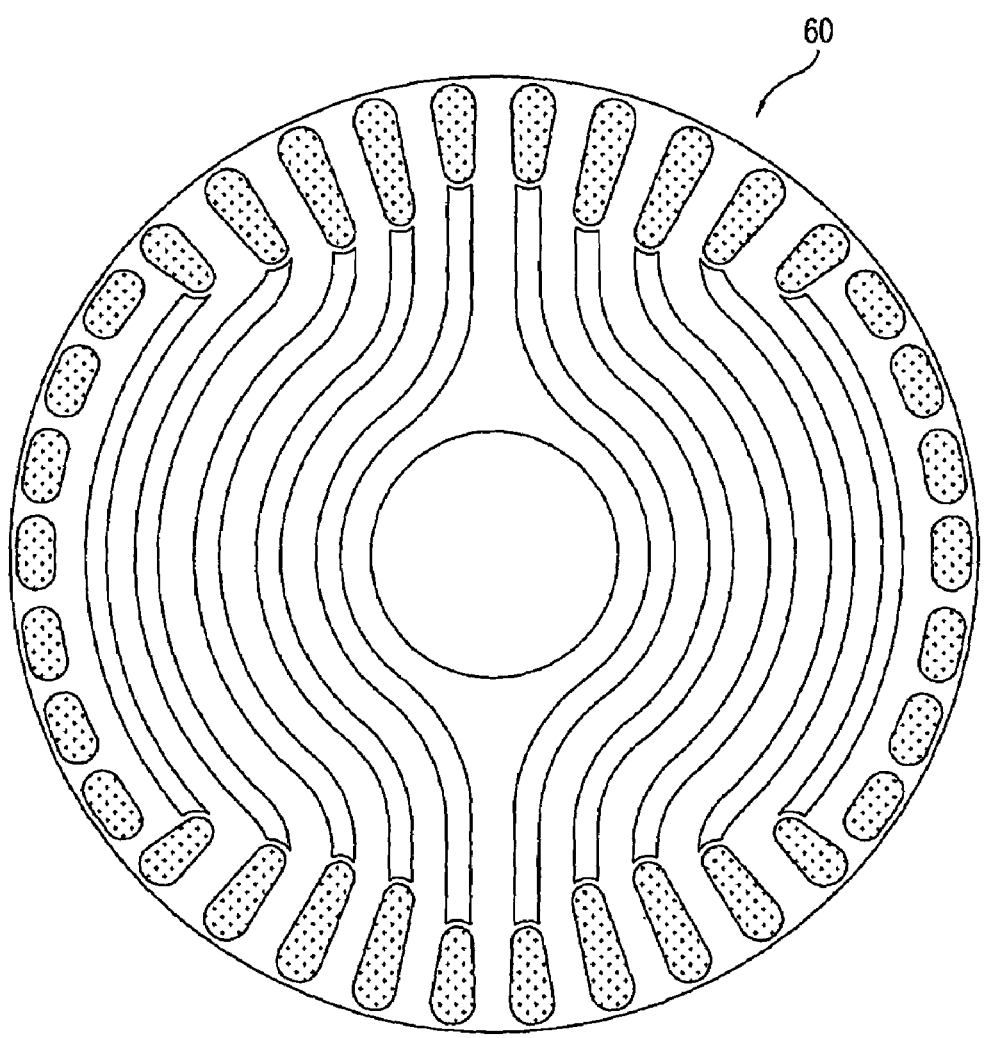
FIG. 6 is a plane view illustrating a rotor for a line-start reluctance motor in accordance with a sixth embodiment of the present invention.

FIG. 6 is a plane view illustrating a rotor for a line-start reluctance motor in accordance with a sixth embodiment of the present invention. The rotor 60 of FIG. 6 has the whole properties of the rotor 10 of FIG. 1A and the whole properties of the rotor 20 of FIG. 2A. Additionally, all flux barriers approach bars in first and second areas of the rotor 60.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A rotor for a line-start reluctance motor, comprising:
   a core having an axis coupling hole in a coupling direction of a shaft;
   a plurality of bars formed in the periphery of the core; and
   a plurality of flux barriers, one and the other ends of the flux barriers approaching the bars formed in first and second areas facing each other at a predetermined angle on a central line of a first axis on a core plane vertical to the coupling direction, wherein the flux barriers pass through a third or fourth area between the first and second areas and detour around the axis coupling hole, wherein the flux barriers detour around the axis coupling hole in a circular arc shape.

2. The rotor of claim 1, wherein the flux barriers are continuous.

3. The rotor of claim 1, wherein the flux barriers are symmetric on a second axis vertical to the first axis on the core plane.

4. The rotor of claim 1, wherein a rate of an area of the flux barriers to a whole area of the core plane is 0.35 to 0.45.

5. The rotor of claim 4, wherein the rate of the area is 0.39.

6. The rotor of claim 1, wherein a rate of a whole width of the flux barriers to a width between the axis coupling hole and the outer circumference of the core is 0.35 to 0.45.

7. The rotor of claim 6, wherein the rate of the width is 0.405.

8. A rotor for a line-start reluctance motor, comprising:
   a core having an axis coupling hole in a coupling direction of a shaft;
   a plurality of bars formed in the periphery of the core; and
   a plurality of flux barriers, one and the other ends of the flux barriers approaching the bars formed in first and second areas facing each other at a predetermined angle on a central line of a first axis on a core plane vertical to the coupling direction, at least parts of the centers of the flux barriers passing through a third or fourth area between the first and second areas, surrounding the axis coupling hole at predetermined intervals;
   wherein central lines of one and the other ends of the flux barriers and central lines of the bars which the flux barriers approach are disposed in the same directions, the central lines of the bars facing the center of the core.

9. The rotor of claim 8, wherein the central lines of the bars and the central lines of the flux barriers are formed on the same lines.

10. The rotor of claim 1, wherein a width of the flux barriers is equal to or smaller than that of the bars which the flux barriers approach.

11. The rotor of claim 1, wherein intervals between the flux barriers and the bars which the flux barriers approach are constant.

12. The rotor of claim 11, wherein the intervals are less than 0.35 mm.

13. The rotor of claim 1, wherein a width of the outer circumferences of the bars adjacent to the outer circumference of the core is larger than that of the inner circumferences of the bars adjacent to the flux barriers.

14. The rotor of claim 1, wherein some of the bars in the first and second areas are not adjacent to the flux barriers.

15. The rotor of claim 1, wherein intervals between the bars and the outer circumference of the core are all the same.

16. A rotor for a line-start reluctance motor, comprising:
a core having an axis coupling hole in a coupling direction of a shaft;
a plurality of bars formed in the periphery of the core;
a plurality of flux barriers, one and the other ends of the flux barriers approaching the bars formed in first and second areas facing each other at a predetermined angle on a central line of a first axis on a core plane vertical to the coupling direction, at least parts of the centers of the flux barriers passing through a third or fourth area between the first and second areas, surrounding the axis coupling hole at predetermined intervals; and
a plurality of sub flux barriers formed between the bars in the third and fourth areas.

17. A rotor for a line-start reluctance motor, comprising:
a core having an axis coupling hole in a coupling direction of a shaft;
a plurality of bars formed in the periphery of the core; and
a plurality of flux barriers, one and the other ends of the flux barriers approaching the bars formed in first and second areas facing each other at a predetermined angle on a central line of a first axis on a core plane vertical to the coupling direction, at least parts of the centers of the flux barriers passing through a third or fourth area between the first and second areas, surrounding the axis coupling hole at predetermined intervals;
wherein an area of the bars in the third and fourth areas is smaller than that of the bars in the first and second areas.

18. A rotor for a line-start reluctance motor, comprising:
a core having an axis coupling hole in a coupling direction of a shaft;
a plurality of bars formed in the periphery of the core; and
a plurality of flux barriers, one and the other ends of the flux barriers approaching the bars formed in first and second areas facing each other at a predetermined angle on a central line of a first axis on a core plane vertical to the coupling direction, at least parts of the centers of the flux barriers passing through a third or fourth area between the first and second areas, surrounding the axis coupling hole at predetermined intervals;
wherein intervals between the bars in the third and fourth areas are smaller than those between the bars in the first and second areas.

19. A rotor for a line-start reluctance motor, comprising:
a core having an axis coupling hole in a coupling direction of a shaft;
a plurality of bars formed in the periphery of the core; and
a plurality of flux bafflers, one and the other ends of the flux barriers approaching the bars formed in first and second areas facing each other at a predetermined angle on a central line of a first axis on a core plane vertical to the coupling direction, at least parts of the centers of the flux bafflers passing through a third or fourth area between the first and second areas, surrounding the axis coupling hole at predetermined intervals;
wherein a width of the outer circumferences of the bars in the third and fourth areas is larger than that of the outer circumferences of the bars in the first and second areas.

20. The rotor of claim 1, wherein an angle of the first and second areas is 100 to 110°.

21. The rotor of claim 20, wherein the angle is 104°.

22. A rotor for a line-start reluctance motor, comprising:
a core having an axis coupling hole in a coupling direction of a shaft;
a plurality of bars formed in the periphery of the core; and
a plurality of flux barriers, one and the other ends of the flux barriers approaching the bars formed in first and second areas facing each other at a predetermined angle on a central line of a first axis on a core plane vertical to the coupling direction, at least parts of the centers of the flux barriers passing through a third or fourth area between the first and second areas, surrounding the axis coupling hole at predetermined intervals;
wherein a length of the bars in the first and second areas is larger than that of the bars in the third and fourth areas.

23. The rotor of claim 22, wherein at least one flux barrier is formed between a common tangent line of the inner circumferences of the bars in the first and second areas and a common tangent line of the inner circumferences of the bars in the third and fourth areas.

24. A rotor for a line-start reluctance motor, comprising:
a core having an axis coupling hole in a coupling direction of a shaft;
a plurality of bars formed in the periphery of the core; and
a plurality of flux barriers having their both ends aligned in one direction to approach the bars, respectively, central lines of the bars facing the center of the core and central lines of both ends of the flux barriers being formed in the same directions, the flux barriers being spaced apart from the axis coupling hole.

25. The rotor of claim 24, wherein the central lines of the bars and the central lines of both ends of the flux barriers are formed on the same lines, and the flux barriers are spaced apart from the corresponding bars.

26. A rotor for a line-start reluctance motor, comprising:
a core having an axis coupling hole in a coupling direction of a shaft;
a plurality of bars formed in the periphery of the core;
a plurality of flux barriers having their both ends aligned in one direction to approach the bars, respectively, central lines of the bars facing the center of the core and central lines of both ends of the flux barriers being formed in the same directions; and
a plurality of sub flux barriers formed between the bars disposed in a vertical direction to an alignment direction of the flux barriers.

27. A rotor for a line-start reluctance motor, comprising:
a core having an axis coupling hole in a coupling direction of a shaft;
a plurality of bars formed in the periphery of the core; and
a plurality of flux barriers having their both ends aligned in one direction to approach the bars, respectively, central lines of the bars facing the center of the core and central lines of both ends of the flux barriers being formed in the same directions;

wherein an area of the bars disposed in the vertical direction to the alignment direction of the flux barriers is smaller than that of the bars disposed in the alignment direction of the flux barriers.

28. A rotor for a line-start reluctance motor, comprising:
a core having an axis coupling hole in a coupling direction of a shaft;
a plurality of bars formed in the periphery of the core; and
a plurality of flux barriers having their both ends aligned in one direction to approach the bars, respectively, central lines of the bars facing the center of the core and central lines of both ends of the flux barriers being formed in the same directions;
wherein intervals between the bars disposed in the vertical direction to the alignment direction of the flux barriers are smaller than those between the bars disposed in the alignment direction of the flux barriers.

29. The rotor of claim 24, wherein a width of the outer circumferences of the bars disposed in the vertical direction to the alignment direction of the flux barriers is larger than that of the outer circumferences of the bars disposed in the alignment direction of the flux barriers.

30. A rotor for a line-start reluctance motor, comprising:
a core having an axis coupling hole in a coupling direction of a shaft;
a plurality of bars formed in the periphery of the core; and
a plurality of flux barriers having their both ends aligned in one direction to approach the bars, respectively, central lines of the bars facing the center of the core and central lines of both ends of the flux barriers being formed in the same directions;
wherein a length of the bars disposed in the alignment direction of the flux barriers is larger than that of the bars disposed in the vertical direction to the alignment direction of the flux barriers.

31. The rotor of claim 30, wherein at least one flux barrier is formed between a common tangent line of the inner circumferences of the bars disposed in the alignment direction of the flux barriers and a common tangent line of the inner circumferences of the bars disposed in the vertical direction to the alignment direction of the flux barriers.

32. The rotor of claim 24, wherein a width of the flux barriers is equal to or smaller than that of the bars disposed in the alignment direction of the flux barriers.

33. A rotor for a line-start reluctance motor, comprising:
a core having an axis coupling hole in a coupling direction of a shaft;
a plurality of bars formed in the periphery of the core; and
a plurality of flux barriers having their both ends aligned in one direction to approach the bars, respectively, a width of the flux barriers being substantially equal to or smaller than that of the bars which both ends of the flux barriers approach,
wherein a width of the outer circumferences of the bars disposed in the vertical direction to the alignment direction of the flux barriers is larger than that of the outer circumferences of the bars disposed in the alignment direction of the flux barriers.

34. A rotor for a line-start reluctance motor, comprising:
a core having an axis coupling hole in a coupling direction of a shaft;
a plurality of bars formed in the periphery of the core;
a plurality of flux barriers having their both ends aligned in one direction to approach the bars, respectively, a width of the flux barriers being equal to or smaller than that of the bars which both ends of the flux barriers approach; and
a plurality of sub flux barriers formed between the bars disposed in a vertical direction to an alignment direction of the flux barriers.

35. A rotor for a line-start reluctance motor, comprising:
a core having an axis coupling hole in a coupling direction of a shaft;
a plurality of bars formed in the periphery of the core; and
a plurality of flux barriers having their both ends aligned in one direction to approach the bars, respectively, a width of the flux barriers being equal to or smaller than that of the bars which both ends of the flux barriers approach;
wherein an area of the bars disposed in the vertical direction to the alignment direction of the flux barriers is smaller than that of the bars disposed in the alignment direction of the flux barriers.

36. A rotor for a line-start reluctance motor, comprising:
a core having an axis coupling hole in a coupling direction of a shaft;
a plurality of bars formed in the periphery of the core; and
a plurality of flux bafflers having their both ends aligned in one direction to approach the bars, respectively, a width of the flux bafflers being equal to or smaller than that of the bars which both ends of the flux bafflers approach;
wherein intervals between the bars disposed in the vertical direction to the alignment direction of the flux barriers are smaller than those between the bars disposed in the alignment direction of the flux barriers.

37. The rotor of claim 34, wherein a width of the outer circumferences of the bars disposed in the vertical direction to the alignment direction of the flux barriers is larger than that of the outer circumferences of the bars disposed in the alignment direction of the flux bafflers.

38. A rotor for a line-start reluctance motor, comprising:
a core having an axis coupling hole in a coupling direction of a shaft;
a plurality of bars formed in the periphery of the core; and
a plurality of flux bafflers having their both ends aligned in one direction to approach the bars, respectively, a width of the flux bafflers being equal to or smaller than that of the bars which both ends of the flux bafflers approach;
wherein a length of the bars disposed in the alignment direction of the flux barriers is larger than that of the bars disposed in the vertical direction to the alignment direction of the flux barriers.

39. The rotor of claim 38, wherein at least one flux barrier is formed between a common tangent line of the inner circumferences of the bars disposed in the alignment direction of the flux barriers and a common tangent line of the inner circumferences of the bars disposed in the vertical direction to the alignment direction of the flux barriers.

40. A rotor for a line-start reluctance motor, comprising:
a core having an axis coupling hole in a coupling direction of a shaft;
a plurality of bars formed in the periphery of the core; and
a plurality of flux barriers aligned in one direction, a length of the bars disposed in an alignment direction of the flux barriers being larger than that of the bars disposed in a vertical direction to the alignment direction of the flux barriers.

41. The rotor of claim 40, wherein at least one flux barrier is formed between a common tangent line of the inner circumferences of the bars disposed in the alignment direction of the flux bafflers and a common tangent line of the inner circumferences of the bars disposed in the vertical direction to the alignment direction of the flux barriers.

42. The rotor of claim 40, wherein the flux barriers are formed between the bars disposed in the vertical direction to the alignment direction of the flux barriers.

43. The rotor of claim 40 or 42, wherein an area of the bars disposed in the vertical direction to the alignment direction of the flux barriers is smaller than that of the bars disposed in the alignment direction of the flux barriers.

44. The rotor of claim 40 or 42, wherein intervals between the bars disposed in the vertical direction to the alignment direction of the flux barriers are smaller than those between the bars disposed in the alignment direction of the flux barriers.

45. The rotor of claim 40 or 42, wherein a width of the outer circumferences of the bars disposed in the vertical direction to the alignment direction of the flux barriers is larger than that of the outer circumferences of the bars disposed in the alignment direction of the flux barriers.

46. The rotor of claim 33, wherein the width of the flux barriers are substantially constant.

* * * * *